(12) United States Patent
Struyk (10) Patent No.: US 8,264,361 B2
(45) Date of Patent: *Sep. 11, 2012

(54) FLUID FLOW INDICATOR WITH AUTOMATIC ALARM TIMER FOR HIGH PRESSURE/LOW FLOW APPLICATIONS

(75) Inventor: David A. Struyk, Deephaven, MN (US)

(73) Assignee: Waterstrike Incorporated, Excelsior, MN (US)

( * ) Notice: Subject to any disclaimer, the term of this patent is extended or adjusted under 35 U.S.C. 154(b) by 707 days.

This patent is subject to a terminal disclaimer.

(21) Appl. No.: 12/255,267

(22) Filed: Oct. 21, 2008

(65) Prior Publication Data

US 2009/0167540 A1 Jul. 2, 2009

Related U.S. Application Data

(60) Provisional application No. 61/009,725, filed on Dec. 29, 2007.

(51) Int. Cl.
*G08B 21/00* (2006.01)
(52) U.S. Cl. ........ 340/603; 340/606; 340/610; 340/611; 73/1.19; 73/1.23
(58) Field of Classification Search .................. 340/500, 340/603, 606, 610, 611, 623, 632, 626; 200/81 R, 200/81.9 R, 81.9 M; 73/1.19, 1.23
See application file for complete search history.

(56) References Cited

U.S. PATENT DOCUMENTS

| | | | |
|---|---|---|---|
| 3,678,881 A * | 7/1972 | Shinn ........................... 73/28.01 |
| 4,181,835 A | 1/1980 | Stadler et al. |
| 4,207,563 A * | 6/1980 | Soupal ........................... 340/626 |
| 4,213,021 A | 7/1980 | Alexander |
| 4,435,626 A | 3/1984 | Coffin |
| 4,500,759 A | 2/1985 | deFasselle et al. |
| 4,513,184 A | 4/1985 | Hughes |
| 4,630,360 A * | 12/1986 | Ochsner et al. ................. 29/622 |
| 4,739,135 A | 4/1988 | Custer |
| 4,763,114 A | 8/1988 | Eidsmore |
| 4,823,383 A | 4/1989 | Ferlin |
| 4,930,488 A | 6/1990 | Pearman et al. |
| 4,996,396 A | 2/1991 | Smith |
| 5,018,964 A | 5/1991 | Shah |
| 5,019,678 A | 5/1991 | Templeton et al. |
| 5,070,220 A | 12/1991 | Glenn |
| 5,191,317 A * | 3/1993 | Toth et al. ..................... 340/626 |
| 5,333,596 A | 8/1994 | Clifford |

(Continued)

*Primary Examiner* — Albert Wong
*Assistant Examiner* — Ryan Sherwin
(74) *Attorney, Agent, or Firm* — Schroeder & Siegfried, P.A.

(57) ABSTRACT

A highly sensitive low loss and low flow fluid flow switch is coupled with an automatic timer and/or optional transmitter to indicate the flow of gas to an appliance and to automatically start a reminder timer to turn the appliance off. After a preset time limit has expired, the timer either sounds an alarm or wirelessly triggers an alarm in a remote location. The receiver portion of the wireless timer may be mounted directly to the appliance (grill handle), so that the timer automatically resets when activity (cover opening or closing) is detected, indicating the appliance is still in use. An alarm can also be configured to sound when the grill is attempted to be ignited with the cover closed, thereby avoiding a potential explosion. A biasing attraction magnet is incorporated in the fluid flow switch to offset either the force of gravity or a return spring in order to extend performance to low pressure and low flow applications. The piston is sealed for use in high pressure/low flow applications, and provided with a vent hole for residual gas bleed-off upon a stoppage of gas flow.

25 Claims, 10 Drawing Sheets

U.S. PATENT DOCUMENTS

| | | | |
|---|---|---|---|
| 5,416,294 A | 5/1995 | Glenn | |
| 5,608,383 A | 3/1997 | Neil | |
| 5,617,840 A | 4/1997 | Clifford | |
| 5,628,242 A | 5/1997 | Higley | |
| 5,659,295 A * | 8/1997 | Renfroe et al. | 340/626 |
| 5,692,215 A * | 11/1997 | Kutzik et al. | 710/18 |
| 5,813,394 A | 9/1998 | Clifford | |
| 6,114,823 A * | 9/2000 | Doner et al. | 340/610 |
| 6,155,160 A | 12/2000 | Hochbrueckner | |
| 6,289,792 B1 | 9/2001 | Grando | |
| 6,338,279 B1 * | 1/2002 | Tsataros | 73/861.56 |
| 6,472,624 B1 | 10/2002 | Harris et al. | |
| 6,528,748 B2 | 3/2003 | Harris et al. | |
| 6,684,757 B2 | 2/2004 | Petersen | |
| 6,733,276 B1 | 5/2004 | Kopping | |
| 6,741,179 B2 | 5/2004 | Young | |
| 6,914,532 B2 * | 7/2005 | Crooks et al. | 340/606 |
| 7,105,757 B2 | 9/2006 | Valentini | |
| 7,117,893 B1 | 10/2006 | Krupa | |
| 7,207,780 B2 * | 4/2007 | Bach | 417/53 |
| 7,298,280 B2 * | 11/2007 | Voege et al. | 340/606 |
| 7,471,259 B2 * | 12/2008 | Wrathall et al. | 343/895 |
| 7,859,144 B1 * | 12/2010 | Sahyoun | 310/15 |

* cited by examiner

FLUID FLOW INDICATOR WITH AUTOMATIC ALARM TIMER FOR HIGH PRESSURE/LOW FLOW APPLICATIONS

CROSS REFERENCE TO RELATED APPLICATIONS

This application is an application for a patent which is also disclosed in Provisional Application Ser. No. 61/009,725, filed on Dec. 29, 2007 by the same inventor, namely David A. Struyk, and entitled "GAS FLOW INDICATOR WITH AUTOMATIC ALARM TIMER," the benefit of the filing date of which is hereby claimed.

BACKGROUND OF THE INVENTION

The present invention relates generally to the field of fluid flow indicators. More particularly, the present invention relates to a gas flow indicator which utilizes a highly sensitive gas flow switch in combination with a timer, alarm system and optional activity sensor for alerting the presence of sustained gas flow after a predetermined period of time.

Gas-operated appliances, such as barbecue grills, deck heaters, fireplaces, and the like have become commonplace. The availability of either natural or propane gas as a fuel makes these appliances particularly convenient. However, it is commonplace for the users of such appliances to accidentally leave the appliances turned on long after their intended period of use. Portable propane tanks are frequently exhausted after the users forget to turn the appliances off. This leads to an expensive waste of fuel, the inconvenience of refilling portable gas tanks, and a considerable safety hazard. The problem is magnified when the appliances are plumbed directly to the available natural gas supply or household propane tank. With millions of gas grills and other gas appliances being sold around the world each year, clearly an effective signaling/safety device is desirable.

Others have heretofore attempted to solve the above problem. Nearly all such attempts, however, have resulted in devices in which the intended purpose is to turn off the appliance (cease gas flow) after a certain predetermined amount of time. Patents disclosing this type of a gas flow control device include the following: U.S. Pat. Nos. 6,684,757; 5,628,242; 4,823,838; 6,733,276; 5,813,394; 6,289,792; 5,617,840; 7,117,893; and 5,333,596. To the knowledge of the applicant, however, none of these devices have ever become standard equipment on any commercially available gas appliance.

The reason for this is due primarily to the increased liability associated with such devices. Once a device of this nature is installed, there becomes an assumption of safety on the part of the owner, where he/she begins to rely on such a device as a convenience feature designed to automatically turn off the appliance. While it may indeed be convenient, should the device fail for any reason, the device which was originally intended as a safety feature, is now regarded as the cause of something potentially catastrophic.

In such devices, a single "upstream" valve is virtually always disclosed as a master valve to cut off the supply of gas to the burners. However, the individual burner valves will still remain in their previously open position, allowing even small amounts of gas to pass in the event the master cutoff valve fails to seal completely. This accumulated gas could lead to a catastrophic explosion the next time the appliance is operated. Therefore, gas-operated appliance manufacturers have been reluctant to include such "automatic" devices on their products, preferring instead to rely on the user to turn off the device himself, effectively leaving responsibility, and therefore liability, with the user.

In U.S. Pat. No. 5,608,383, an automatic temperature alarm system is disclosed, wherein the device is more appropriately intended to be a warning device rather than a shut-off switch. This device utilizes a temperature sensor to detect operation of a gas grill and a vibration sensor to detect whether the grill has been untouched for an excessive period of time, thereby sounding the alarm. Any detection of vibration causes a timer to reset, thus preventing the alarm from sounding.

Regardless of the type of system utilized, reliable detection of appliance operation is paramount. Unfortunately, with today's more sophisticated gas appliances, temperature is not the best means for detecting operation. In older gas grills, for instance, where there may have been only one or two burners, both housed within a single grill chamber, a single temperature sensor may have been sufficient. But with today's grills, multiple burners, as well as accessory side burners and dedicated rotisserie burners, are common. This would require multiple temperature sensors to accurately determine whether or not the grill is actually operating, complicating installation and raising the cost of implementation.

Other detection mechanisms have also been previously contemplated. The detection of gas valve/knob position would only indicate an intent to use, and all valves/knobs would need to be individually instrumented. Flame detection and non-contact infra-red suffer from the same multi-burner issues as the temperature sensor. External non-contact infra-red also suffers from issues of "field of view", sensor contamination, and varying surface properties. Additionally, calibration is required for the property known as emissivity, making the same system difficult to use on appliances constructed of different outer materials, such as porcelain enamel versus stainless steel.

A more viable and safer alternative for detecting operation of a gas appliance is to sense gas flow to the appliance. Detecting gas flow has the advantage in that it can reliably cover all burners, whether ignited or not, from a single location. However, sensing the flow of gas in a gas grill is complicated by the fact that both the pressure and the flow rate of gas to the grill are extremely low. For instance, in a typical propane gas grill, high pressure liquefied propane is stored in a portable tank attached to the grill. The pressure in the tank varies with temperature, but may well be over 150 psi. Because of this, a low pressure regulator is required to reduce the pressure of the gas to a safe working pressure of just 11" water column (WC), which is just 0.4 psi. For natural gas systems, the pressure is even lower, typically just 7" WC, or 0.25 psi. In the case of propane, the rate of flow on the high pressure side of the regulator, due to the increased pressure, is even lower than that on the low pressure side. This makes reliable detection of the flow of gas difficult.

Gas flow switches/detectors are available in the prior art, but most are ill-suited for use in low pressure/low flow applications. They are available in many forms, but typically employ a piston or a vane, which activates an electrical switch. Piston designs can be used in what is known as "positive displacement" configurations. While a typical gas flow switch may indicate when the flow rate is above a particular threshold, a positive displacement design ideally does not allow gas to flow at all without providing an indication.

In such a device, a differential pressure generated within the switch body between the input and the output provides the necessary operating force to move the piston out of the way, allowing gas to flow. Typically, a magnet residing within the piston is used to trigger an external reed switch or Hall effect sensor attached to the flow switch body, thereby detecting the flow of gas. A spring, magnet, or gravity is generally used to provide the return force necessary to reset the gas flow switch in the absence of gas flow.

U.S. Pat. No. 6,684,757 mentions in passing the possibility of detecting operation of a gas grill via the detection of gas flow, but it fails to address the problem and difficulty of sensing gas flow in such a low pressure/low flow application as is present with the gas grill appliance. For such low pressure applications, where the gas flow switch may be placed downstream of the pressure regulator, both the flow and the pressure are too low for a typical flow switch. Such switches tend to reduce pressure and restrict flow, thus hindering the performance of the appliance. Furthermore, whether positioned downstream or upstream from the pressure regulator, pistons utilized in such gas flow switches are commonly subject to oscillation. Therefore, enhancements must be made in order for reliable gas flow detection to function without significant pressure loss and flow restriction.

It is therefore an object of the present invention to provide a novel configuration of a fluid flow indicator/switch which is highly sensitive and useful for detecting the flow of gas in low flow applications, such as with gas grills and the like, and which will function accurately without significant pressure loss or flow restriction.

It is also an object of the present invention to provide a novel configuration of a piston-type positive displacement fluid flow indicator/switch which is highly sensitive and useful for detecting the flow of gas in low flow applications, such as with gas grills and the like, and which is devoid of any substantial piston oscillation.

It is still a further object of the present invention to provide such a novel and useful fluid flow indicator which utilizes a highly sensitive fluid flow switch in combination with a timer, alarm system and optional activity sensor for alerting the presence of sustained gas flow after a predetermined period of time.

BRIEF SUMMARY OF THE INVENTION

It will be noted that the present invention pertains primarily to the use of gas-operated appliances, such as gas grills, gas patio heaters, gas fireplaces, and the like. Although it is contemplated that the present invention would also be useful in applications involving the detection of liquid flow rates, it is deemed to have particular significance in connection with the detection of extremely low rates of gas flow in gas-operated appliances. For this reason, the discussion herein will focus primarily on fluid flow indicators for gas-operated appliances, it being understood that the principles of my invention apply equally to applications involving the flow of a liquid. For further ease of illustration, the discussion hereafter will also be limited primarily to the context of a gas grill, it being understood that the principles of the present invention apply equally to all gas appliances.

It is the goal of this invention to provide an inexpensive, convenient to use, and easily installed low loss/low flow gas flow switch which provides a warning signal after a predetermined time of operation of a gas grill. In this way, the user will be reminded to turn off the gas grill after such time has expired. In the present invention, detection of gas flow is used to automatically set a timer, which may or may not include an activity sensor to reset the timer, and either a local alarm, a wirelessly linked alarm, or both. The gas flow switch of the present invention is of an inline, coaxial design, incorporating a lightweight piston that travels in a close fitting cylinder. It incorporates a reed switch which is activated via a magnet carried in the piston upon sensing the flow of gas. Activation of the reed switch in turn initiates an alarm timing mechanism that is set for a predetermined acceptable time of operation.

The gas flow switch may be installed either upstream or downstream of the gas flow regulator. If downstream of the regulator, where both the pressure and flow of gas is extremely low, the gas flow switch is intended to be installed in a vertical orientation. In normal operation, when the flow of gas is turned on by one of the grill burner valves, a small differential pressure provides a sufficient lifting force to raise the piston above the outlet ports, allowing gas to flow to the grill, and simultaneously activating the reed switch.

Even the lightest weight piston, however, will decrease the available gas pressure to the grill, causing performance of the grill to suffer. Therefore, in order to effectively reduce the weight of the piston, a piston biasing member in the form of a second attractive biasing magnet is positioned at the upper end of the cylinder to attract the piston, thereby reducing the pressure necessary to support it above the outlet ports. This biasing magnet acts as a non-linear spring, providing an increasing force of attraction as the piston gets closer, acting inversely to any mechanical spring. The biasing magnet is sized appropriately so that it is not capable of supporting the weight of the piston without the addition of some differential pressure. Therefore, when the gas flow is turned off, the differential pressure equalizes, and the piston returns to its "OFF" or resting position by the force of gravity.

In the case of installation on the high pressure side of the regulator, the flow switch is generally installed in a horizontal orientation, and may be fitted with ACME/QCC-1 (CGA791) input and output coupling connections for quick and easy installation between the propane tank and low pressure regulator. With this configuration, gravity will not work to return the piston to its gas "OFF" or resting position; therefore, a spring is used to generate the required return force. In this case, the spring may be used in combination with the attractive biasing magnet to reduce the pressure necessary to activate the reed switch, as the biasing magnet has the effect of linearizing and reducing the force of the return spring. Since gas flow is extremely low on this side, in order to prevent gas "blow-by," the piston is sealed relative to the piston cylinder. A piston vent hole is then provided to allow for the escape of gas upon return of the piston to its resting position. The spring and vent hole are appropriately sized to ensure both piston travel at the lowest possible flow rate, and the reliable return of the piston to its gas OFF position when the flow ceases.

Piston oscillation is also a significant problem with such gas flow switches, particularly downstream of the pressure regulator, where gas pressure is low. The biasing magnet, along with a semi-sealing magnet support positioned at the end of the internal cylinder which houses the piston, dampens piston oscillation by way of providing stabilizing forces. The coaxial nature of the inner cylinder concentric within the primary outer chamber, allows for a semi-sealed chamber beyond the piston, thereby forming a dashpot damper. This, in conjunction with the attractive magnet, completely eliminates oscillation of the piston.

These improvements effectively create a highly sensitive low loss/low flow gas flow switch which may be coupled with an automatic timer and/or optional transmitter to indicate the flow of gas to an appliance and to automatically start a reminder timer to turn the appliance off. After a preset time limit has expired, the timer either sounds an alarm or wirelessly triggers an alarm in a remote location. The receiver portion of the wireless timer may be mounted directly to the appliance (grill handle), so that the timer automatically resets when activity (cover opening or closing) is detected, indicating the appliance is still in use. An alarm can also be configured to sound when the grill is attempted to be ignited with the cover closed, thereby avoiding a potential explosion.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF THE INVENTION

Shown in FIGS. 1 thru 5 is a fluid/gas flow switch 1 constructed in accordance with the present invention and configured for installation and use downstream of a typical gas grill appliance pressure regulator, or for use with household natural gas, where both the pressure and flow of gas is extremely low. The gas flow switch 1 includes an outer housing 3 with a threaded gas inlet port 5 and threaded outlet port 7. Gas flow switch 1 is therefore adapted to be threadably and sealably connected in vertical orientation (with inlet port 5 below the outlet port 7) inline with the gas line leading to the gas grill, downstream of the pressure regulator.

As shown in FIGS. 2 thru 5, the outer housing 3 includes an interior bore or chamber extending therethrough within which inner cylinder 9 is seated in sealed relation via o-ring 11. Inner cylinder 9 in turn carries piston 13 within its confines in close, free-floating slip-fit relation. Adjacent the inlet end of the flow switch 1, the housing 3 forms a radially inwardly protruding shoulder stop 15 for inner cylinder 9 and piston 13. Inner cylinder 9 is held firmly in place within housing 3 by cylinder head 17 and retaining ring 19 located adjacent the outlet end of flow switch 1.

In the low pressure/low flow embodiment shown in FIGS. 1 thru 5, piston 13 is uniquely designed to carry two (2) thin Neodymium switch-activating magnets, 21 and 23, rather than a single magnet. Magnets 21 and 23 are inserted from opposite ends of the piston 13, and held in place by mutual attraction, separated only by a small inwardly protruding shoulder or rib 25. This design allows for the magnets 21 and 23 to "float" slightly within a very lightweight piston 13, thus accommodating changes in temperature, and avoiding the use of messy adhesives. Recessing the magnets 21 and 23 within the piston 13 also enables them to capture by magnetic attraction small foreign metallic matter entering cylinder 9, thus preventing potential lodgment of such matter between the walls of piston 13 and cylinder 9, and consequent adverse operation of the grill.

The inner cylinder 9 includes a plurality of fluid flow orifices or gas outlet ports 29 extending through its outer wall, which communicate freely with a gas flow pathway 31 formed between the reduced outer diametrical surface 33 of inner cylinder 9 and the inner chamber surface 35 of housing 3. As shown best in FIGS. 2 and 4, pathway 31 then communicates with outlet port 7 of the gas flow switch 1 through a plurality of peripheral openings 37 formed in cylinder head 17 to allow gas to pass therethrough.

The gas flow switch 1 incorporates a reed switch 39 (or Hall effect sensor) which is activated via switch-activating magnets 21 and 23 carried in the piston 13 upon sensing the flow of gas. As shown in FIGS. 2 thru 5, in the preferred embodiment, reed switch 39 is collocated on a transmitter printed circuit board 41 (PCB), which is attached to the outer housing 3 of the gas flow switch 1. The electronics, comprising the transmitter PCB 41, battery 43 and a small loop antenna 45, are located under a plastic cover 47 affixed the housing 3 of gas flow switch 1.

As will be discussed in more detail hereafter, activation of the reed switch 39 in turn initiates an alarm timing mechanism (not shown) that is set for a predetermined acceptable time of operation. It is deemed desirable that the actual transmitter circuit never needs battery replacement; therefore, it has been designed with a single small lifetime battery 43. Battery 43 is expected to last up to 20 years, with normal usage, never requiring a change. Therefore, the entire transmitter electronics package may be potted, or filled with an epoxy like sealant, allowing for all weather operation.

Figure 1:
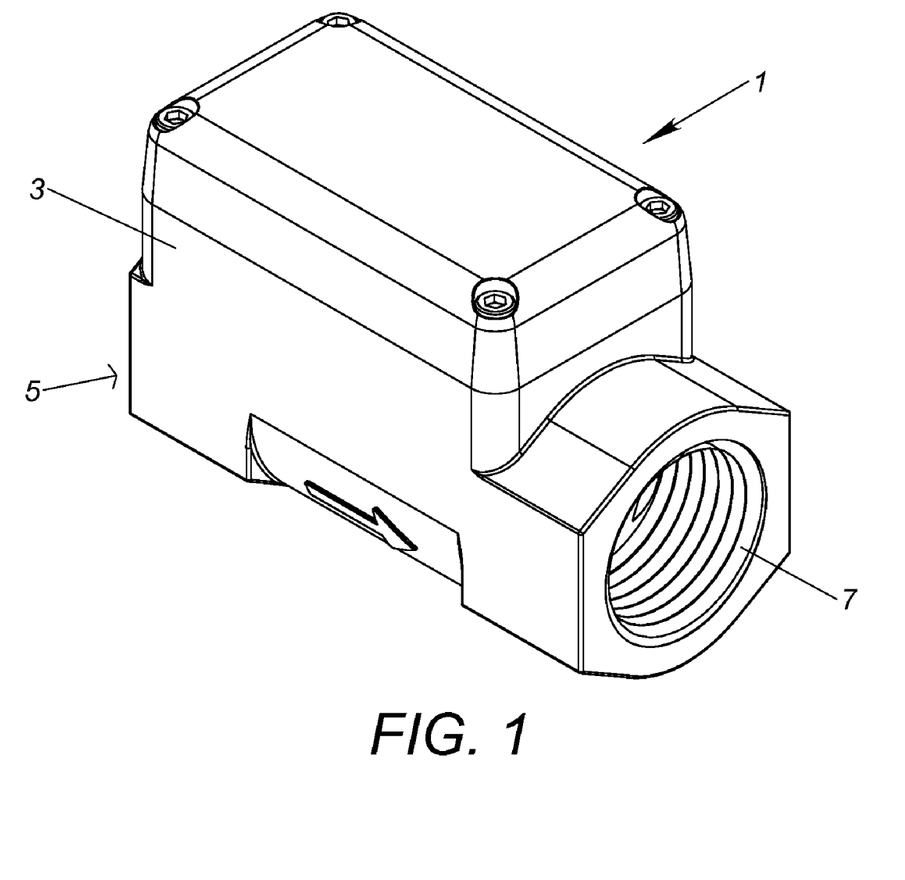
FIG. 1 is a perspective view of a gas flow switch embodying the principles of the present invention and configured for use in low pressure/low flow applications.
Figure 2:
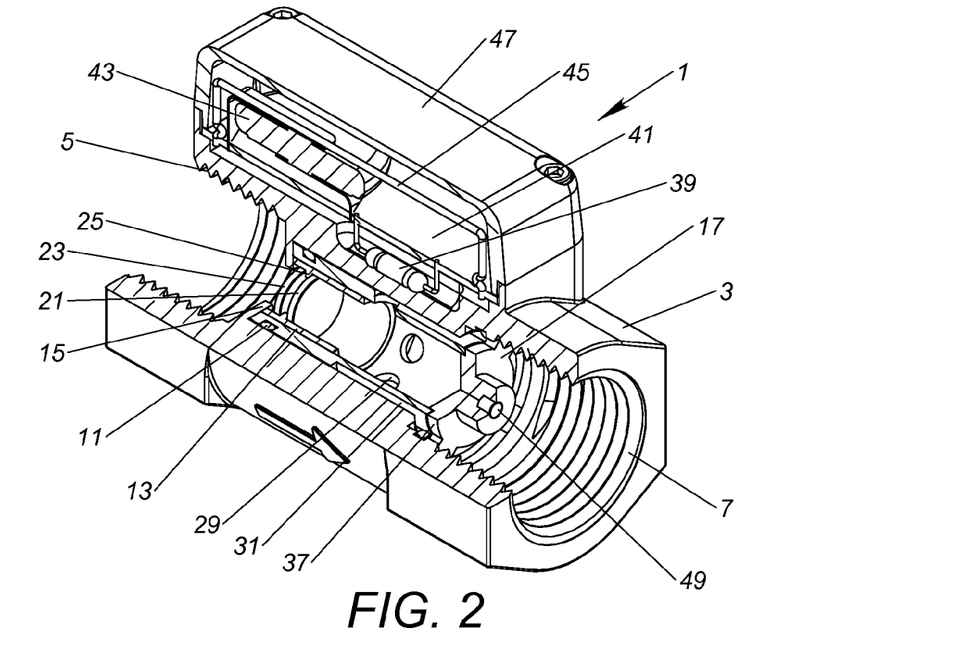
FIG. 2 is a perspective sectional view of the gas flow switch in FIG. 1, with a cutaway section thereof removed to illustrate the configuration and operation of the switch under no gas flow conditions.
Figure 3:
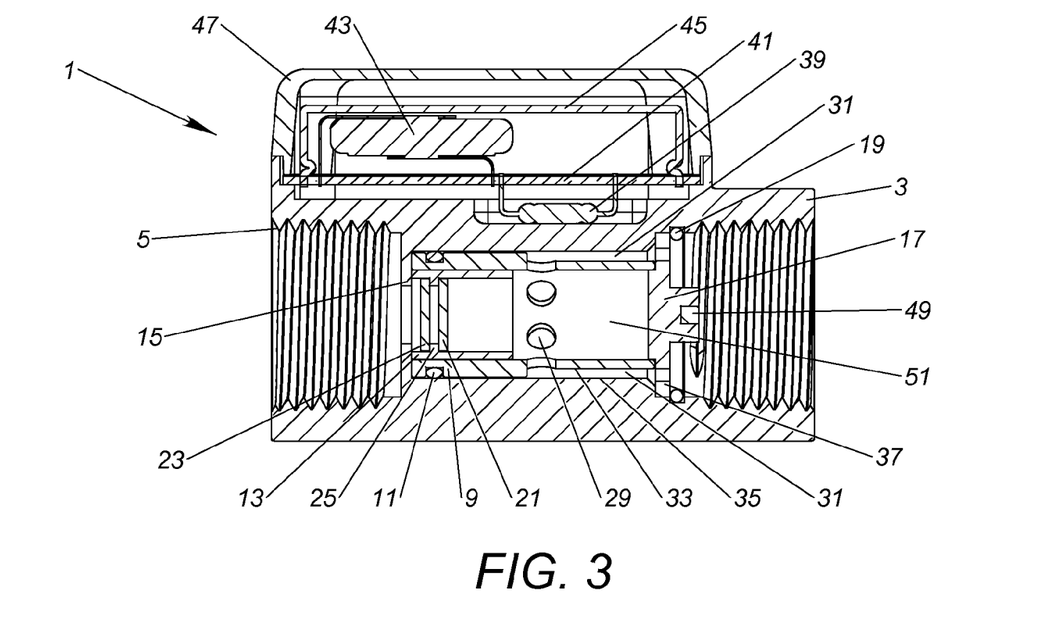
FIG. 3 is a vertical sectional view of the gas flow switch in FIG. 1, also illustrating the configuration and operation of the switch under no gas flow conditions.
Figure 4:
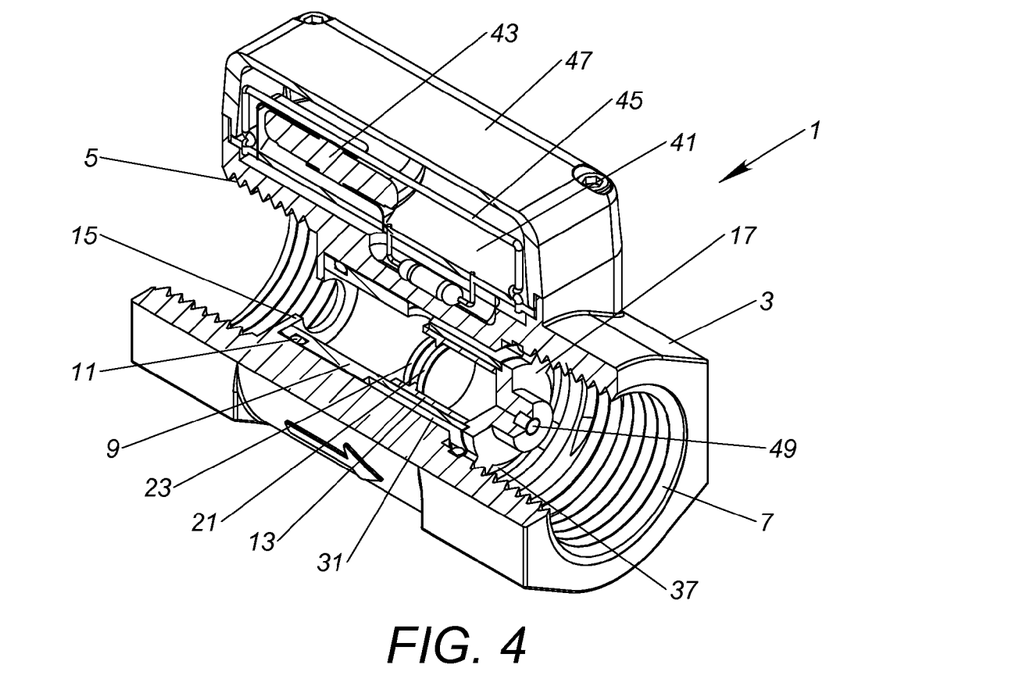
FIG. 4 is a perspective sectional view of the gas flow switch in FIG. 1, with a cutaway section thereof removed to illustrate the configuration and operation of the switch when gas is flowing.
Figure 5:
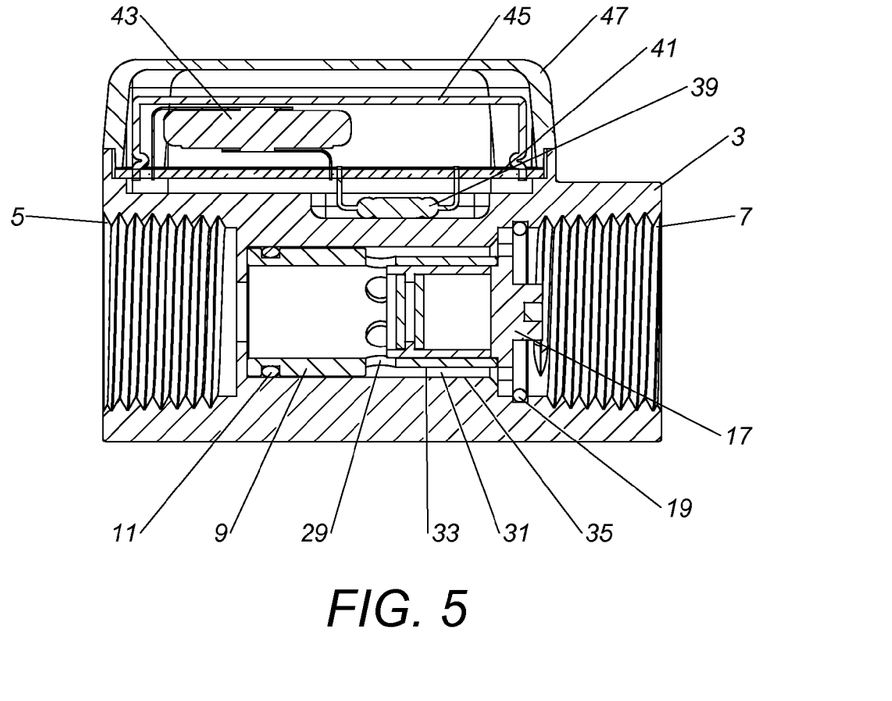
FIG. 5 is a vertical sectional view of the gas flow switch in FIG. 1, also illustrating the configuration and operation of the switch when gas is flowing.
Figure 6:
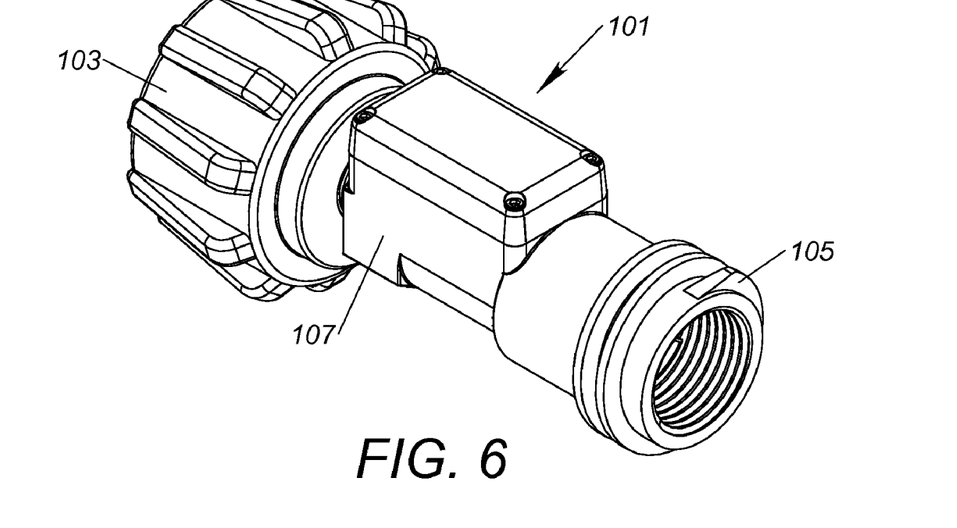
FIG. 6 is a perspective view of an alternative embodiment of a gas flow switch embodying the principles of the present invention and configured for use in high pressure/low flow applications.

In FIGS. 2 and 3, the gas flow switch 1 is shown in a gas "OFF" position, with piston 13 resting against shoulder stop 15 at the input end of cylinder 9. In this position, the magnets 21 and 23 within the piston 13 are sufficiently far from the reed switch 39 so that it is not activated. As shown in FIGS. 4 and 5, when the flow of gas is turned "ON" by one of the grill burner valves, a small differential pressure provides a sufficient lifting force to raise the piston 13 above the outlet ports 29, allowing gas to flow through outlet ports 29, into pathway 31 and out through port 7 to the grill. Simultaneously, reed switch 39 is activated, thus triggering detection of the flow of gas and activating the alarm timing mechanism.

However, even the lightest weight piston 13 will decrease the available gas pressure to the grill, causing performance of the grill to suffer. In order to effectively reduce the weight of the piston 13 and counter the force of gravity, an attractive biasing member or magnet 49 is embedded in the cylinder head 17 positioned at the upper end of the cylinder 9. This biasing magnet 49 attracts magnets 21 and 23 carried within the piston 13, thereby helping to attract piston 13 toward its switch-activating position and effectively reduce the pressure necessary to support it above the outlet ports 29.

The attractive biasing magnet 49 acts as a non-linear spring, providing an increasing force of attraction as the piston gets closer, acting inversely to any mechanical spring. This is an ideal solution to reducing the effective weight of piston 13, as it only acts on the piston 13 after it has been raised, allowing it to fully return to its rest position. The biasing magnet 49 is sized appropriately so that it is not capable of supporting the weight of the piston 13 without the addition of some differential pressure. Therefore, when the gas flow is turned off, the differential pressure equalizes, and the piston 13 returns to its "OFF" or resting position by the force of gravity. Achieving this effect mechanically would introduce friction and hysteresis, negatively affecting the performance of the sensor. This approach provides a nearly frictionless lifting force, as the piston can freely fall with very little drag from the cylinder sidewalls.

FIGS. 6 thru 10 of the drawings illustrate an alternative embodiment of a gas flow switch 101 which is designed for connection between a typical gas grill propane tank and the existing low pressure regulator, where gas pressure is high but the rate of gas flow is even lower. In this embodiment, the integrated gas flow switch is fitted with an ACME/QCC-1 (CGA791) female input connector 103 and a similar male output connector 105 for quick and easy installation by the grill owner. In the preferred embodiment, it is contemplated that the connector 103 will be connected directly to the propane tank. Therefore, in this embodiment, flow switch 101 will likely be horizontally oriented, versus the vertical installation of gas flow switch 1 on the low pressure side of the pressure regulator.

As seen best in FIGS. 7 thru 10, the main housing body 107 of gas flow switch 101 and the tank connector 103 are cooperatively threaded to facilitate a sealed threadable engagement therebetween. The opposite or outlet end of housing 107 is integrally formed as a male QCC-1 coupler 105 with a typical internal safety gas valve 109 contained therewithin, similar to that of a standard propane tank. With the ability to connect the gas flow switch 101 directly inline to a standard propane tank, it is evident that this configuration is particularly well-suited for use as an aftermarket add-on product.

The gas flow switch 101 is generally constructed and functions in a manner similar to gas flow switch 1 of the previous embodiment. As shown in FIGS. 7 thru 10, gas flow switch 101 similarly includes an inner cylinder 111, piston 113 with switch-activation magnets 115 and 117, and an electronic module comprising a reed switch (or Hall effect sensor) 119, transmitter PCB 121, battery 123 and antenna 125 contained by cover 127.

Figure 9:
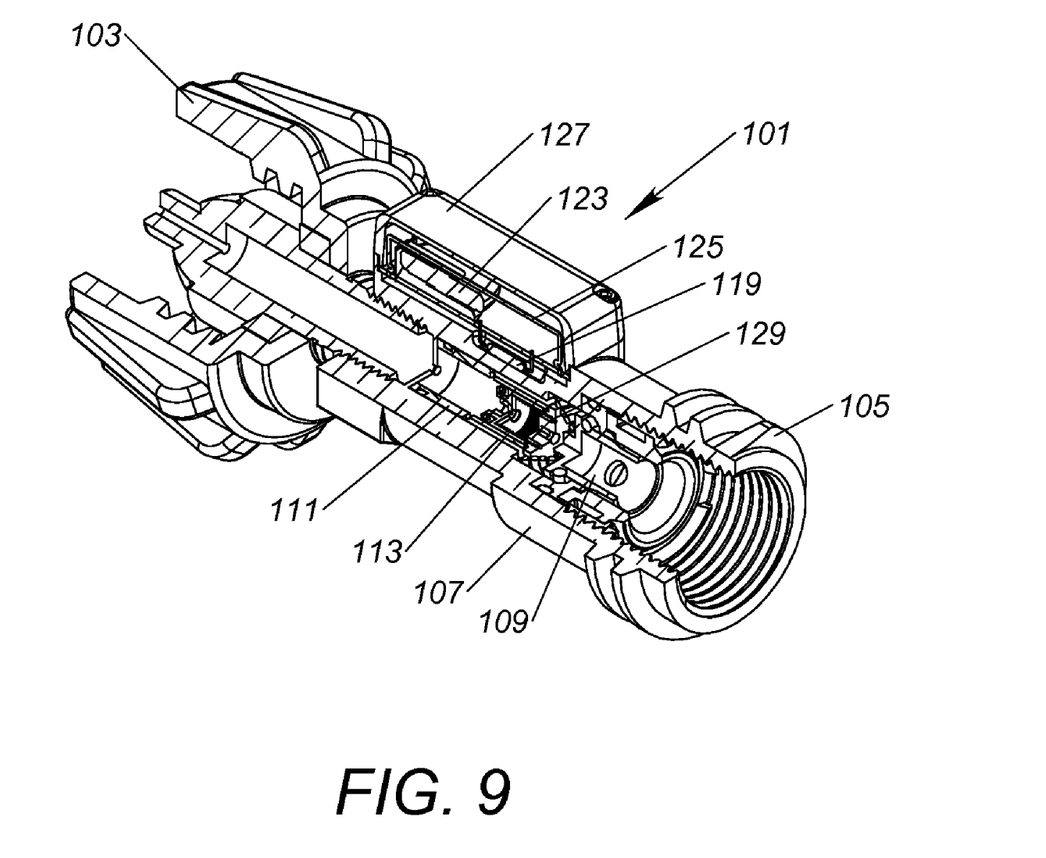
FIG. 9 is a perspective sectional view of the gas flow switch in FIG. 6, with a cutaway section thereof removed to illustrate the configuration and operation of the switch when gas is flowing.
Figure 10:
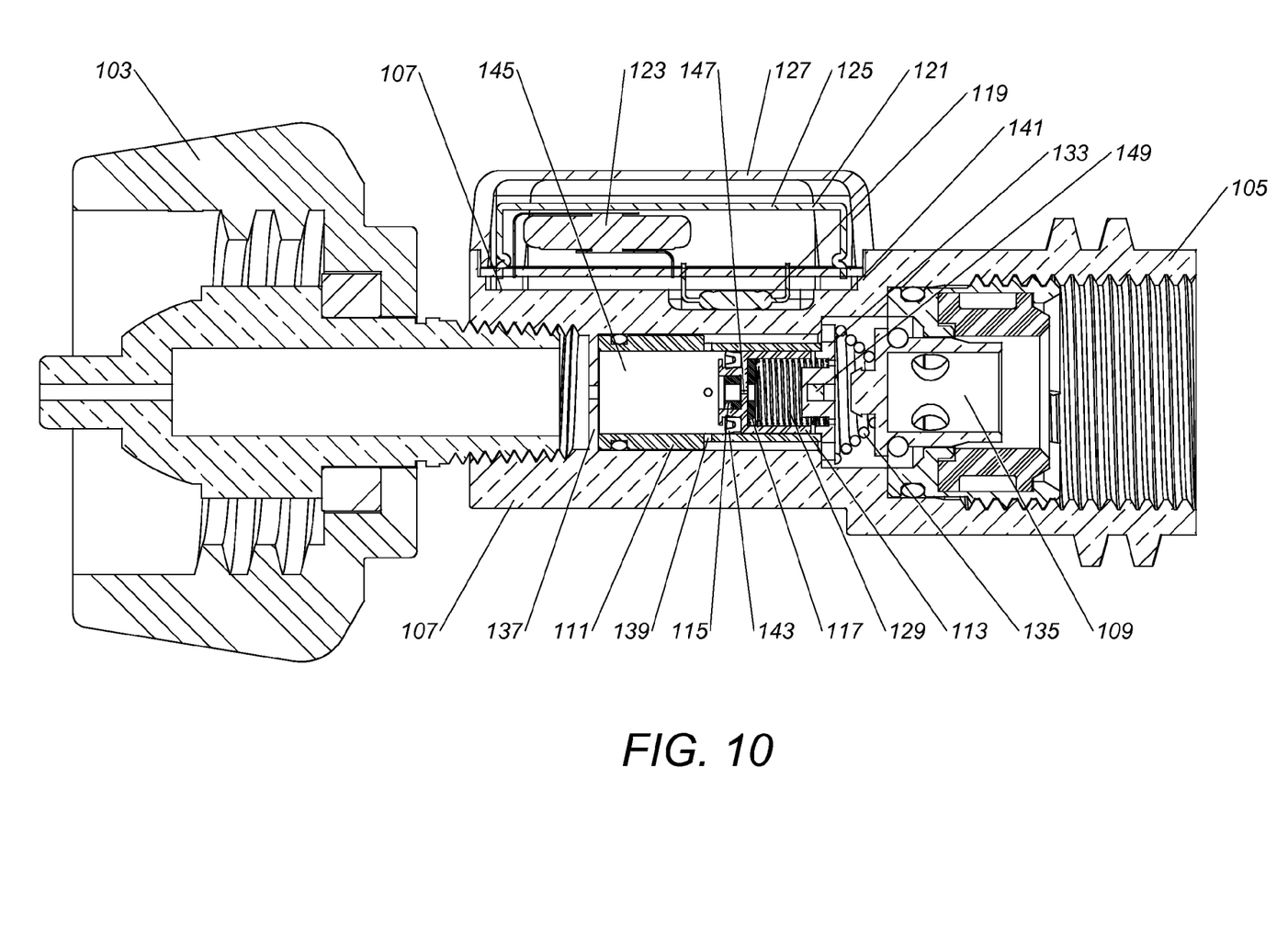
FIG. 10 is a vertical sectional view of the gas flow switch in FIG. 6, also illustrating the configuration and operation of the switch when gas is flowing.

However, detection of the flow of gas on the high pressure side of the regulator presents an additional problem. The flow of gas is so low that, unless the piston is sealed against the piston cylinder wall, the gas will leak around the piston without any appreciable force being applied thereto. Therefore, in order to prevent such gas blow-by, the piston 113 is configured to carry an outer annular seal 143 which seals the piston 113 against the wall of the inner cylinder 111, yet allows the piston 113 to move readily between its "OFF" resting position (FIGS. 7 and 8) and its switch-activating position (FIGS. 9 and 10).

In the absence of gas flowing, piston 113 must return to its resting position. In order for this to occur, any residual gas contained in the forward end 145 of cylinder 111 must be allowed to slowly escape. However, since piston 113 is sealed relative to cylinder 111, such residual gas cannot dissipate around the piston and will thus restrict the return of piston 113 unless some means of escape is provided. To accomplish this, piston 113 is provided with a vent hole 147 which extends axially through the middle thereof, thus allowing any residual gas in the forward end 145 of cylinder 111 to seep through to the other side of piston 113 upon a stoppage of gas flow. While tolerance requirements between piston 113 and cylinder 111 make it difficult to prevent gas blow-by without seal 143, it has been found that the use of such a sealed piston configuration 113 with a vent hole 147 can adequately provide the desired response characteristics for the detection of gas flow on the high pressure side of the regulator.

Since gas flow switch 101 is configured for installation in the horizontal position, gravity will not aid in returning the piston 113 to its original resting or gas "OFF" position upon a stoppage of gas flow. Therefore, a very weak spring 129 is carried within cylinder 111 and used to provide force against piston 113 for the return to its resting position at the inlet end of cylinder 111 when the flow of gas is cut off. The spring and vent are adjusted in combination to ensure piston travel at the lowest possible gas flow, i.e. that of a single burner at its lowest setting, while still allowing for the piston to fully return to its gas off position in the absence of gas flow. The spring needs to be strong enough to overcome the additional friction of the seal, while the hole needs to be small enough to allow sufficient gas pressure to build within the cylinder to move the piston, thereby activating the reed switch at the lowest possible flow rate without bypassing through the vent itself. In this case, a biasing magnet 149, similar to the biasing magnet 49 utilized in gas flow switch 1 of the previous embodiment, can be used to offset and linearize the force of the spring, thus reducing the differential pressure necessary to activate the switch. This is beneficial, as at higher pressures the flow rate is significantly reduced, making it difficult to generate sufficient pressure to overcome the spring force and activate the switch.

To accommodate spring 129, piston 113 is constructed such that piston 113 defines a chamber 131 facing cylinder head 133 and the outlet of gas flow switch 101. As shown, spring 129 seats within chamber 131 and is retained thereby. The opposite end of spring 129 seats against biasing magnet 149 within the cylinder head 133 covering the outlet of inner cylinder 111, which is retained by retaining spring 135.

Figure 7:
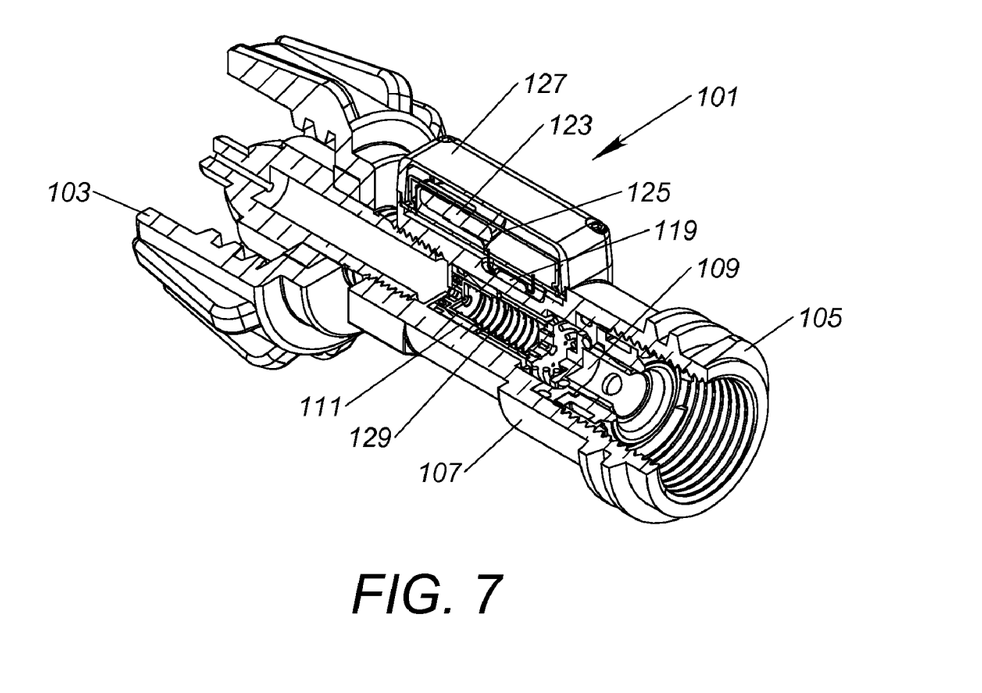
FIG. 7 is a perspective sectional view of the gas flow switch in FIG. 6, with a cutaway section thereof removed to illustrate the configuration and operation of the switch under no gas flow conditions.
Figure 8:
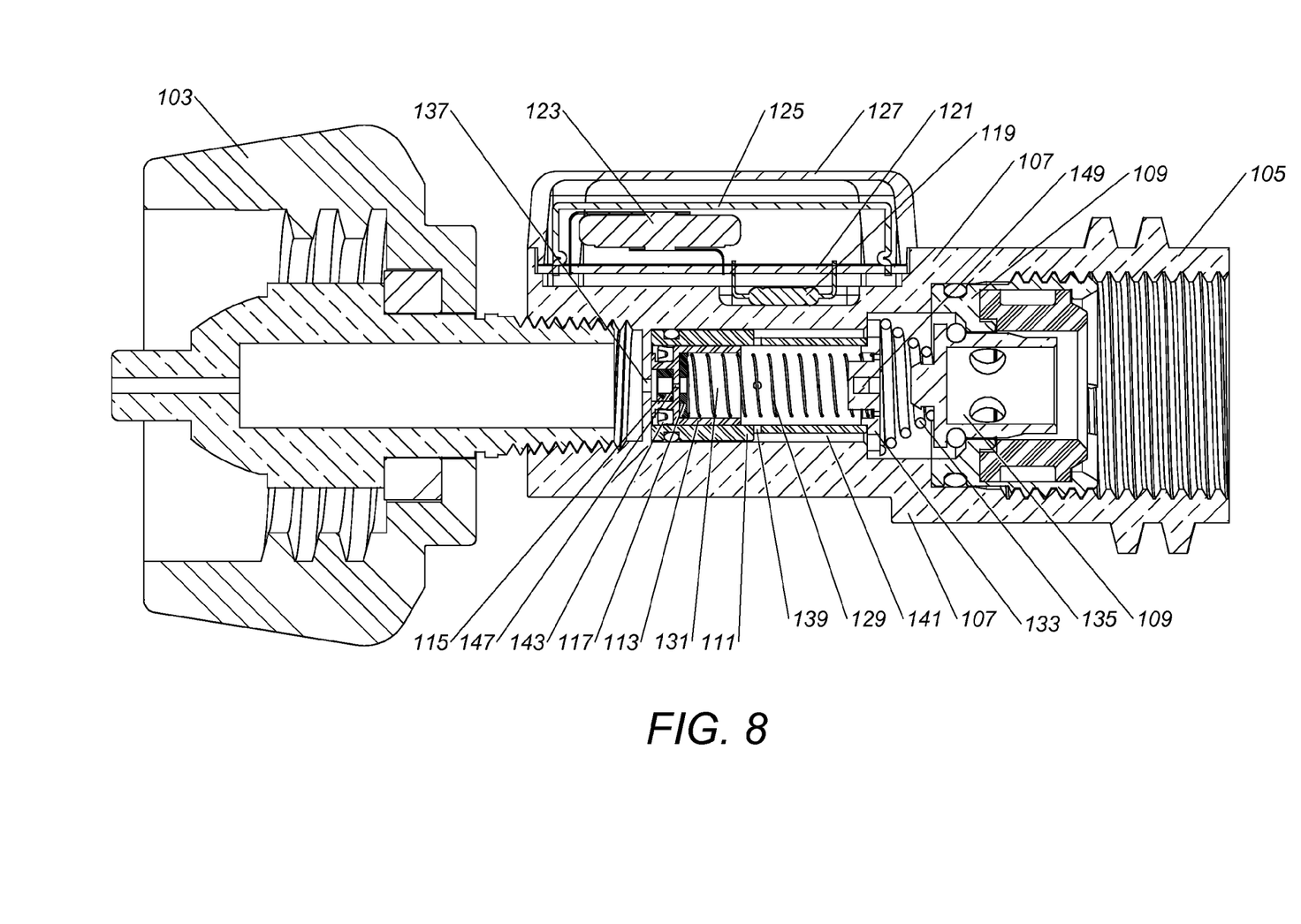
FIG. 8 is a vertical sectional view of the gas flow switch as shown in FIG. 6, also illustrating the configuration and operation of the switch under no gas flow conditions.

In a similar manner to the previous embodiment, in FIGS. 7 and 8, the gas flow switch 101 is shown in a gas "OFF" position, with piston 113 being held in place by spring 129 against shoulder stop 137 at the input end of cylinder 111. In this position, the magnets 115 and 117 within the piston 113 are sufficiently far from the reed switch 119 so that it is not activated. As shown in FIGS. 9 and 10, however, when the flow of gas is turned "ON" by one of the grill burner valves, a small differential pressure provides a sufficient force to move the sealed piston 113 past the outlet ports 139, allowing gas to flow into pathway 141, through safety valve 109 and out of the gas flow switch 101 to the grill. Simultaneously, reed switch 119 is activated, thus triggering detection of the flow of gas and activating the alarm timing mechanism.

When the gas flow is turned off, the differential pressure equalizes, and spring 129 exerts a force against piston 113 to return it to its "OFF" or resting position. Any residual gas retained in the forward end 145 of the piston cylinder 111 will bleed off and escape through vent hole 147 in piston 113, thus allowing piston 113 to return to its resting position.

In either embodiment, the gas flow switch (1, 101) is designed to function in applications involving extremely low rates of gas flow, and is therefore quite sensitive to any change in gas pressure. Under such circumstances, and particularly in low pressure/low flow applications, conventional gas flow switches commonly experience piston oscillation caused by sudden variances in gas pressure. In the present invention, however, each embodiment of the gas flow switch (1, 101) is designed with a dashpot dampening mechanism to alleviate any such piston oscillation.

In both embodiments, the attractive biasing magnet (49, 149), along with the semi-sealing cylinder head (17, 133) at the end of the internal cylinder (9, 111) helps to dampen piston oscillations by way of providing stabilizing forces. The coaxial nature of the inner cylinder (9, 111) concentric within the primary outer chamber of the housing (3, 107) allows for a semi-sealed chamber (51, 131) (see, FIGS. 3, 8) beyond the piston (13, 113) forming a dashpot damper. This, in conjunction with the attractive magnet (49, 149), completely eliminates oscillations of the piston (13, 113).

As noted previously, in either embodiment, integrated with the gas flow switch (1, 101) is an alarm timing mechanism. This alarm timing mechanism may incorporate an automatic alarm timer and alarm, or in the preferred embodiment, a wireless transmitter for remote activation thereof. In both configurations, the gas flow switch, circuit board, power supply, and housings are all integrated. This provides for easy installation. In the high pressure approach, the integrated flow switch 101 is fitted with ACME/QCC-1 (CGA791) input and output connections 103 and 105 for quick and easy installation by the grill owner between a typical gas grill propane tank and the existing low pressure regulator. For factory installed applications (Original Equipment Manufacturer—OEM), or for use with household natural gas, connection to the low pressure side using gas flow switch 1 is preferred. The integrated housing of flow switch 1 is quite small, allowing direct inline installation in the gas line using standard tapered or flare fitting connections.

Figure 11A:
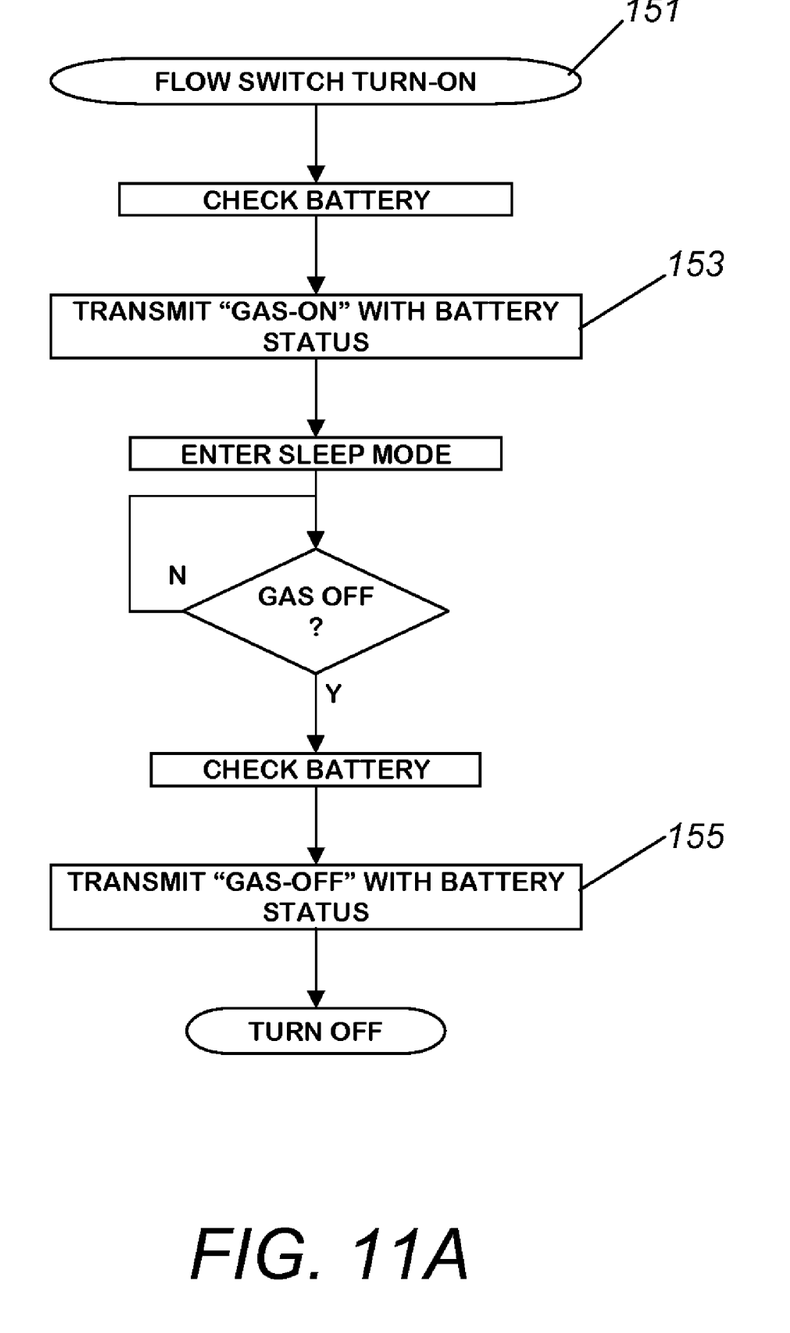
FIGS. 11A, 11B and 11C depict an integrated flow chart system illustrating the operation of an alarm timing mechanism which incorporates a gas flow switch embodying the principles of my invention.
Figure 11B:
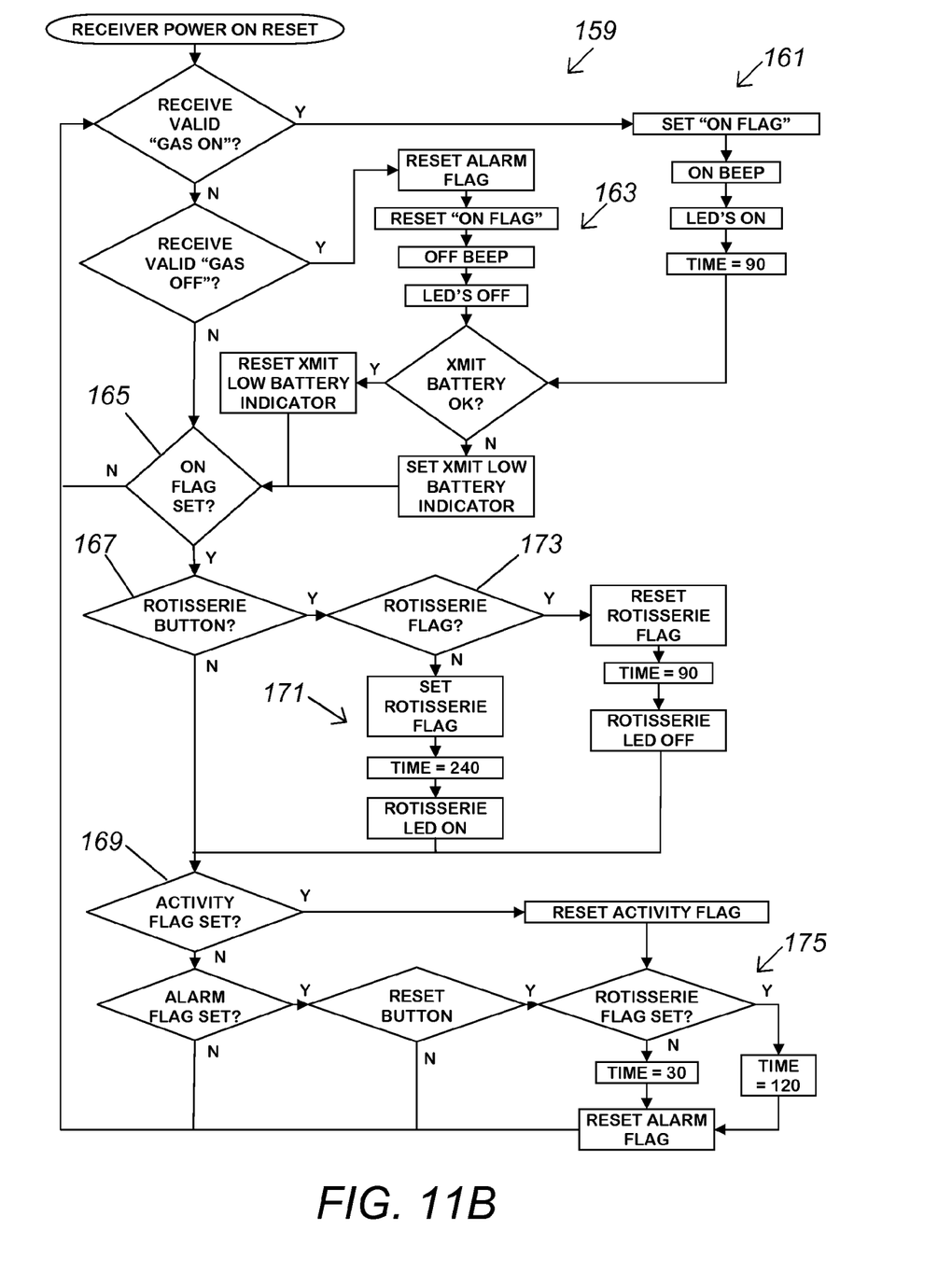
Figure 11C:
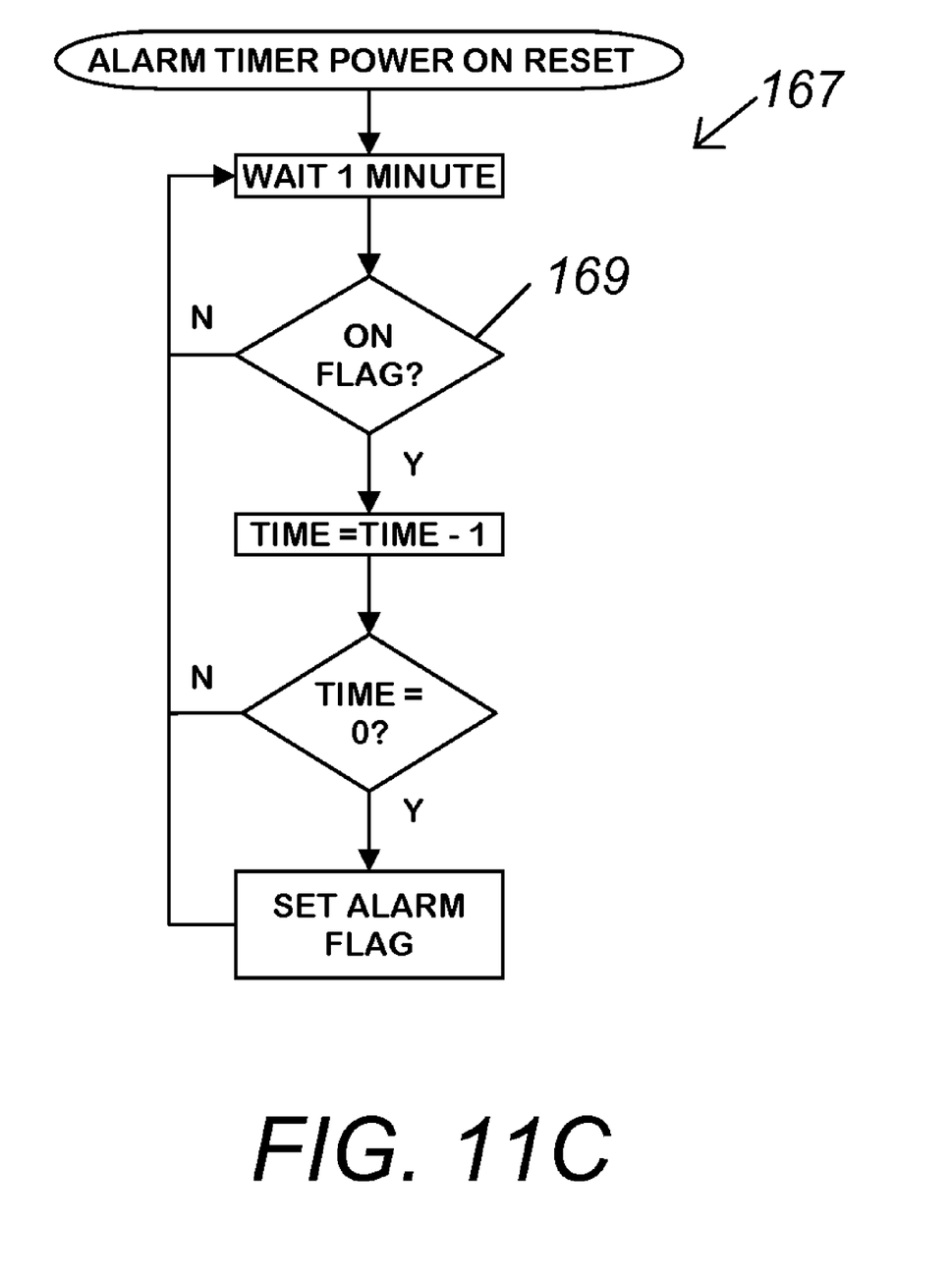

With reference to the flow charts shown in FIGS. 11A, 11B and 11C, operation of the integrated alarm timing mechanism can be illustrated and explained. As denoted at step 151 in FIG. 11A, when gas flows, the flow switch (1, 101) turns on and the switch-activating magnets (21, 23; 115, 117) actuate the reed switch (39, 119), thereby activating the transmitter PCB (41, 121). The circuit is completely off before this point, conserving battery power. The status of the battery (43, 123) is combined with the "GAS-ON" indication and transmitted to the receiver (step 153). The transmitter then enters a power saving sleep mode and waits for the gas flow to stop. When this occurs, the status of the battery (43, 123) is again combined with the GAS-OFF indication and transmitted to the receiver (step 155). The transmitter circuit then powers down.

In the preferred embodiment, when the flow of gas is detected, the transmitter wirelessly sends a "GAS-ON" signal to the receiver of the alarm timing mechanism, which may be mounted on the grill itself, at some other remote location, or both. As seen in FIG. 11B, the receiver circuit, after a power-on reset, runs in a continuous loop 159 that constantly listens for a valid received signal. Upon reception, it determines whether it was a GAS-ON or a GAS-OFF signal. If GAS-ON, it sets the ON-FLAG, which is used to start the timer, sounds the ON beep and LED, and sets the initial time to around 90 minutes (step 161). Of course, this time may be adjusted as desired or needed. If it receives a valid GAS-OFF signal, it resets the ON-FLAG, sounds the OFF beep and turns off the LED; it also resets the alarm in case it was previously on (step 163). With each reception, the transmitter battery is checked and the status displayed with an additional LED.

Once the ON-FLAG is set (step 165), with each pass through the loop 159, accessory buttons 167 (i.e., rotisserie) and an optional activity sensor 169 are checked. If the rotisserie button is pressed, the receiver/timer enters a ROTISSERIE mode, where a rotisserie LED is lit and the timer is set to a much longer time, such as 4 hours (step 171). If the rotisserie button is subsequently pressed, the ROTISSERIE FLAG 173 provides toggling between modes; when deactivated, the ROTISSEIE LED is turned off, and the timer returns to the usual 90 minute setting.

If the optional activity sensor is used, this automatically resets the remaining time to shorter intervals, i.e., 30 minutes for the normal mode, and 120 for the rotisserie mode (step 175), and the countdown begins again. If the alarm has been activated, then pressing the reset button manually resets the alarm timer to 30 or 120 minutes depending on the mode. If the receiver is mounted on the grill handle, user activity can be detected in the form of a tilt switch which senses the cover has been opened or closed. Certain conventional grills already employ such grill handle activity sensors to turn on a cooking light, and could easily be adapted to incorporate such a receiver. A remotely placed receiver, such as in a residential kitchen, does not employ an activity sensor and simply begins counting down after the "GAS-ON" signal is received. In this case, the handle mounted receiver can optionally contain an additional transmitter to signal other remote receivers of grill activity so that they can also reset their timers.

As shown in FIG. 11C, the alarm timer routine 167 runs independently of the receiver routine and activates the alarm after the time has decremented to zero. The ON FLAG 169 prevents the alarm from being activated when the grill is off. When the ALARM FLAG is set by the alarm timer, the hardware sounds the alarm.

If the grill, and thus the gas, should be shut off before the time has expired, the transmitter sends a "GAS-OFF" signal to the receiver(s), prompting the receiver's timer unit to reset itself, as at step 163, and wait for the next GAS-ON signal. If a receiver timer should reach its limit, it is assumed that the operating grill has been forgotten, and a reminder alarm is sounded. The receivers are fitted with a push button to disable the alarm, and reset the timer to another predetermined time, 30 minutes for example. If the receiver still has not received a GAS-OFF signal after this new period of time, the grill alarm sounds again. This will happen indefinitely until the grill is turned off.

Each receiver is powered by easily replaceable AA type batteries, or configured with a typical AC plug. The operating range of the transmitter/receiver combination is approximately 100 feet. As noted previously, included with each and every transmission, is the battery status. In the unlikely event the grill should ever out last the transmitter battery (43, 123), a low battery status alarm will be activated in the receiver/alarm, indicating it is time to replace the transmitter unit. Since the receiver/timer units need to always be "listening" for a GAS-ON signal, they consume more power than the transmitters, and have therefore been designed with easily replaceable batteries or a direct AC power connection.

When used with the activity sensor, to avoid a possible explosion, if the flow of gas is first detected while the grill cover is closed, the system will sound the alarm until either the flow of gas is turned off or the cover is opened. This is not possible with other means of operation detection, such as temperature or flame detection, where the response is too late. This feature can also be integrated with the grill ignition system to actually prevent the ignition spark from occurring while the cover is closed, rather than just sounding an alarm.

Obviously, in such case, it is highly desirable for the flow switch (1, 101) to have a fast response when alerting the user that the cover is closed while attempting to ignite the grill. Therefore, it is contemplated that the dashpot performance of the gas flow switch may be easily adjusted to improve switch performance by incorporating a small vent hole or grooves (not shown) in the respective cylinder head (17, 133) of the flow switch (1, 101), so that a minimum of damping occurs, thus allowing for a faster response.

The gas flow switch (1, 101) of either embodiment is fabricated from gas safe components. The outer housing (3, 107) is preferably fabricated from brass, and the electronics module cover (47, 127) of plastic. The piston (13, 113) and inner cylinder (9, 111), on the other hand, are ideally constructed of aluminum. This ensures that the piston will be as light weight as possible, and that sizing tolerances between the piston and inner cylinder will remain consistent during thermal expansion and contraction. Thus, even though the piston and cylinder are close fitting, operation across the temperature of interest will not be affected.

In the preferred embodiment, the gas flow switch (1, 101) is complete with a small wireless transmitter and power supply. The transmitter is ideally in the 433 MHz region, where operation is allowed by the FCC and frequencies are low enough to pass through walls of ordinary construction, necessary if the transmitter is located out of doors with the grill, and the receiver is perhaps located indoors. The 915 MHz region could also be considered. It would provide for smaller antennas, but the indoor/outdoor transmission may suffer.

It is possible that modern grill configurations could potentially cause transmission problems. The lower pedestal of a modern gas grill is frequently configured as a cabinet, providing a location to "hide" the propane tank and keep it from view. These are typically constructed of metal, and can be problematic for the transmitter if located at the tank as in the high pressure application, or connected near the manifold as in the low pressure application. The metal cabinet forms a shield, effectively blocking radio transmissions from the transmitter antenna to the receiver.

To overcome this, rather than use a typical antenna, connection can be made directly to the brass housing (3, 107) of the gas flow switch (1, 101). Thus, when connected to the propane tank, as in the high pressure application, the tank becomes a highly effective antenna, coupling to other metal structure that it is in contact with, and radiating beyond the cabinet. In the low pressure application, when connected to the metal gas line near the valves and manifold, the entire upper structure of the grill becomes the radiating element. In each case, the problem of the closed cabinet is eliminated.

When the above items are combined, the present invention provides a safe and effective means to prevent accidental gas appliance operation in the event the operator forgets to turn the appliance off. It is highly effective, simple and easy to install, but still leaves the ultimate responsibility of turning off the appliance with the operator.

It will, of course, be understood that various changes may be made in the form, details, arrangement and proportions of the parts without departing from the scope of the invention which comprises the matter shown and described herein and set forth in the appended claims.

The invention claimed is:

1. A fluid flow switch for detecting exceptionally low rates of fluid flow, comprising:
 (a) a housing having an inlet port, an outlet port and an inner piston cylinder extending between and communicating with said inlet port and said outlet port so as to facilitate passage of a fluid therebetween;
 (b) a piston carrying a seal within said piston cylinder and being movable in sealed relation against an inner wall surface thereof between a resting position and a position where a switch is first activated in response to the presence of said fluid flowing through said piston cylinder, said piston being constructed to block free flow of said fluid between said inlet port and said outlet port when positioned between said resting position and said position where said switch is first activated;
 (c) said switch being operatively disposed for activation upon movement of said piston to said position where said switch is first activated;
 (d) a vent hole extending through said piston to facilitate controlled dissipation of said fluid through said piston and the return of said piston to said resting position upon a stoppage of said fluid flowing through said piston cylinder; and
 (e) a piston biasing member carried within said piston cylinder for urging said piston toward said resting position upon a stoppage of said fluid flowing through said piston cylinder.

2. The fluid flow switch of claim 1, wherein said piston biasing member is comprised of a spring.

3. The fluid flow switch of claim 1, wherein said vent hole extends generally axially through said piston relative to said piston cylinder.

4. The fluid flow switch of claim 1, wherein said vent hole is sized appropriately to facilitate dissipation of residual fluid from within said piston cylinder upon a stoppage of fluid flow therethrough, yet restrict fluid flow through said piston sufficiently to cause said piston to move toward said position where said switch is first activated in response to the presence of said fluid flowing through said piston cylinder.

5. The fluid flow switch of claim 1, wherein said switch is an electrical switch that is magnetically activated by a switch-activating magnet carried by said piston when said piston is located in said position where said switch is first activated.

6. The fluid flow switch of claim 5, including a power source, a transmitter and a receiver for activating an alarm, whereupon activation of said electrical switch electrically connects said power source to said transmitter, thereby causing a wireless electronic signal to be transmitted to said receiver to activate said alarm.

7. The fluid flow switch of claim 6, wherein said electrical switch, said power source and said transmitter are integrated as a single unit with said housing.

8. The fluid flow switch of claim 6, wherein said transmitter includes an antenna electrically connected to an outer metallic body portion of a gas-operated appliance with which said fluid flow switch is used, thereby converting said gas-operated appliance into an extension of said antenna.

9. The fluid flow switch of claim 1, wherein said piston is constructed to carry a pair of free-floating switch-activating magnets, said switch-activating magnets being disposed on opposite sides of a shoulder member and held in place through mutual magnetic attraction.

10. The fluid flow switch of claim 1, wherein said piston cylinder has a cylinder wall with a fluid-flow orifice extending therethrough, and opposite ends adjacent said inlet and said outlet ports, said piston cylinder being capped at said end adjacent said outlet port to define a separate semi-sealed cavity within said piston cylinder, thereby forming a dashpot damper to minimize oscillation of said piston.

11. The fluid flow switch of claim 1, wherein said inlet end of said housing is comprised of a female quick connect coupling to facilitate direct connection to a source of gas supply.

12. The fluid flow switch of claim 1, wherein said outlet end of said housing is comprised of a male quick connect coupling to facilitate direct connection to a gas supply line of a gas-operated appliance.

13. The fluid flow switch of claim 1, including a counter-biasing member constructed to partially offset the force of said piston biasing member as said piston approaches said position where said switch is first activated.

14. The fluid flow switch of claim 13, wherein said piston biasing member is comprised of a spring and said counter-biasing member is comprised of a magnet.

15. The fluid flow switch of claim 13, wherein said piston biasing member exerts a nonlinear force against said piston and said counter-biasing member is constructed to at least partially linearize the nonlinear force of said piston biasing member.

16. A fluid flow switch and alarm apparatus for detecting exceptionally low rates of fluid flow and producing an alarm warning, comprising:
(a) a housing having an inlet port, an outlet port and an inner piston cylinder extending between and communicating with said inlet port and said outlet port so as to facilitate passage of a fluid therebetween;
(b) a piston carrying a seal within said piston cylinder and being movable in sealed relation against an inner wall surface thereof between a resting position and a position where an electrical switch is first activated in response to the presence of said fluid flowing through said piston cylinder, said piston being constructed to block free flow of said fluid between said inlet port and said outlet port when positioned between said resting position and said position where said electrical switch is first activated;
(c) said electrical switch being adapted to be magnetically activated by a switch-activating magnet carried by said piston when said piston is located in said position where said electrical switch is first activated;
(d) a vent hole extending through said piston to facilitate controlled dissipation of said fluid through said piston and the return of said piston to said resting position upon a stoppage of said fluid flowing through said piston cylinder;
(e) a piston biasing member carried within said piston cylinder for urging said piston toward said resting position upon a stoppage of said fluid flowing through said piston cylinder; and
(f) a power source and wireless transmitter connected to said electrical switch, whereupon activation of said electrical switch transmits power from said power source to said transmitter, thereby causing a wireless signal to be transmitted to a receiver for activation of an alarm.

17. The fluid flow switch and alarm apparatus of claim 16, wherein said electrical switch, power source and wireless transmitter are connected with said housing as a single integrated unit.

18. The fluid flow switch and alarm apparatus of claim 17, wherein said transmitter includes an antenna connected through said housing to a metallic gas-operated appliance and/or metallic gas source, thereby converting said metallic gas-operated appliance and/or metallic gas source to an antenna.

19. The fluid flow switch and alarm apparatus of claim 16, including a timer mechanism for delaying activation of said alarm for a predetermined period of time after said electrical switch is activated in response to detecting the presence of said fluid flowing through said cylinder.

20. The fluid flow switch and alarm apparatus of claim 19, wherein said inlet port of said housing is connected in-line with a gas source, and said outlet port of said housing is connected in-line with a gas-operated appliance, said gas-operated appliance including an activity sensor and means for resetting said timer upon detecting operator use of said gas-operated appliance.

21. The fluid flow switch and alarm apparatus of claim 20, wherein said receiver and said alarm are mounted either on said gas-operated appliance, remotely of said gas-operated appliance, or both.

22. The fluid flow switch and alarm apparatus of claim 20, wherein said gas-operated appliance carries a transmitter that is electrically triggered by said activity sensor to transmit a wireless signal to a remote receiver for resetting a delay timer associated with a remote alarm.

23. The fluid flow switch of claim 16, including a counter-biasing member constructed to partially offset the force of said piston biasing member as said piston approaches said position where said electrical switch is first activated.

24. The fluid flow switch of claim 23, wherein said piston biasing member exerts a nonlinear force against said piston and said counter-biasing member has a tendency to linearize the nonlinear force of said piston biasing member.

25. A fluid flow switch for detecting exceptionally low rates of fluid flow, comprising:
(a) a housing having an inlet port, an outlet port and an inner piston cylinder extending between and communicating with said inlet port and said outlet port so as to facilitate passage of a fluid therebetween;
(b) a piston carried within said piston cylinder, said piston carrying an elastomeric seal disposed in sealing relation between an outer surface of said piston and an inner wall surface of said piston cylinder, said piston being movable in sealed relation to said piston cylinder from a resting position to a position where an electrical switch is first activated in response to the presence of said fluid flowing through said piston cylinder, and said piston being constructed to block free flow of said fluid between said inlet port and said outlet port when positioned between said resting position and said position where said switch is first activated;
(c) said electrical switch being adapted to be magnetically activated by a switch-activating magnet carried by said piston when said piston is located in said position where said switch is first activated;
(d) a vent hole extending through said piston in a direction generally parallel to the axis of said piston cylinder, said vent hole being sized appropriately to control dissipation of said fluid through said piston upon a stoppage of said fluid flowing through said piston cylinder and the return of said piston to said resting position, yet restrict the flow of said fluid through said piston sufficiently to cause said piston to move toward said position where said switch is first activated in response to the presence of said fluid flowing through said piston cylinder; and
(e) a mechanical spring carried within said housing for biasing said piston toward said resting position upon a stoppage of said fluid flowing through said piston cylinder.

* * * * *